United States Patent
Kardashov et al.

(10) Patent No.: US 9,130,776 B2
(45) Date of Patent: Sep. 8, 2015

(54) DATA PATH ACCELERATION USING HW VIRTUALIZATION

(71) Applicant: Marvell World Trade Ltd., St. Michael (BB)

(72) Inventors: Timor Kardashov, Kyriat Ono, IL (US); Maxim Kovalenko, Rehovot, IL (US)

(73) Assignee: MARVELL WORLD TRADE, LTD., St. Michael (BB)

( * ) Notice: Subject to any disclaimer, the term of this patent is extended or adjusted under 35 U.S.C. 154(b) by 2 days.

(21) Appl. No.: 13/681,139

(22) Filed: Nov. 19, 2012

(65) Prior Publication Data

US 2013/0128885 A1  May 23, 2013

Related U.S. Application Data (60) Provisional application No. 61/561,392, filed on Nov. 18, 2011.

(51) Int. Cl.
   *H04L 12/54* (2013.01)
   *H04L 12/721* (2013.01)
   *H04L 12/743* (2013.01)

(52) U.S. Cl.
   CPC .............. *H04L 12/56* (2013.01); *H04L 45/38* (2013.01); *H04L 45/7453* (2013.01)

(58) Field of Classification Search
   USPC ........................................................ 370/389
   See application file for complete search history.

(56) References Cited

U.S. PATENT DOCUMENTS

| | | | |
|---|---|---|---|
| 6,598,034 B1* | 7/2003 | Kloth | 706/47 |
| 7,337,241 B2* | 2/2008 | Boucher et al. | 709/250 |
| 7,508,764 B2* | 3/2009 | Back et al. | 370/235 |
| 7,657,706 B2* | 2/2010 | Iyer et al. | 711/117 |
| 7,804,785 B2* | 9/2010 | Roberts et al. | 370/252 |
| 2003/0081615 A1* | 5/2003 | Kohn et al. | 370/395.42 |
| 2006/0067311 A1* | 3/2006 | Ogata | 370/371 |
| 2006/0193266 A1* | 8/2006 | Siddha et al. | 370/254 |
| 2007/0226795 A1* | 9/2007 | Conti et al. | 726/22 |
| 2008/0002579 A1* | 1/2008 | Lindholm et al. | 370/230 |
| 2008/0082789 A1* | 4/2008 | Kang et al. | 712/205 |
| 2011/0173362 A1* | 7/2011 | Kardashov et al. | 710/264 |

\* cited by examiner

*Primary Examiner* — Shaq Taha
*Assistant Examiner* — Sasha Cintron Pacheco (57) ABSTRACT

A processing core includes a packet classifier, implemented in a single processing core, configured to classify incoming data packets into first data packets of a known data packet flow and into second data packets of an unknown data packet flow, a first path thread, implemented in the single processing core, configured to process ones of the first data packets at least by forwarding the first data packets to a destination that corresponds to a previously determined destination associated with the known data packet flow, and a second path thread, implemented in the single processing core, configured to process a received second data packet at least to determine a new data packet flow for the second data packet.

14 Claims, 4 Drawing Sheets

FIG. 3

DATA PATH ACCELERATION USING HW VIRTUALIZATION

CROSS-REFERENCE TO RELATED APPLICATION

The present application claims priority from U.S. Provisional Patent Application No. 61/561,392, filed Nov. 18, 2011 the disclosure of which is incorporated herein in its entirety by reference.

BACKGROUND

1. Field

The current disclosure relates to method and apparatuses for packet processing, and more particularly, to methods and apparatuses for performing packet processing operations using distinct threads implemented in a single processing core to process different types of packets.

2. Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Packet processing operations can be divided into two different types. A first type includes operations performed by a control plane. These control plane operations include, for example, operations to control various aspects of the overall packet processing operation, including management of network devices, etc., as well as to generate rules used for packet processing. A second type includes operations performed by a data plane. These data plane operations relate to the processing of the data itself, for example, operations such as forwarding, modifying, and routing the data.

A conventional technique implements control plane operations and data plane operations using at least two separate central processing units (CPUs), with at least one of the CPUs being configured to perform control plane operations and the other at least one of the CPUs being configured to perform data plane operations.

SUMMARY

One or more embodiments of the disclosure relate to methods and apparatuses which implement a single processing core to perform control plane operations and data plane operations. The methods and apparatuses according to embodiments achieve a significant network performance boost. Furthermore, the methods and apparatuses according to embodiments are implemented in a single processing core, thereby reducing costs and effort required for installation and use. Moreover, the methods and apparatuses according to embodiments are flexible and scalable.

It is understood, of course, that the methods and apparatuses according to some embodiments are not required to achieve these benefits.

According to an embodiment, there is provided a processing core, including: a packet classifier, implemented in a single processing core, configured to classify incoming data packets into first data packets of a known data packet flow and into second data packets of an unknown data packet flow; a first path thread, implemented in the single processing core, configured to process ones of the first data packets at least by forwarding the first data packets to a destination that corresponds to a previously determined destination associated with the known data packet flow; and a second path thread, implemented in the single processing core, configured to process a received second data packet at least to determine a new data packet flow for the second data packet.

According to an embodiment, the packet classifier is implemented in the first path thread and classifies each of the first data packets into a specific packet flow from among a plurality of packet flows.

According to an embodiment, the classifier classifies the incoming data packets a single time.

According to an embodiment, one of the first path thread and the second path thread modifies each of the incoming data packets after being classified.

According to an embodiment, the processing core further includes a connections hash table comprising entries corresponding to known data packet flows, wherein, for each incoming data packet, the classification unit is configured to determine a hash corresponding to the incoming data packet, classify the incoming data packet as a first data packet of the known data packet flow when the hash matches an entry in the connections hash table, and classify the incoming data packet as a second data packet of the unknown data packet flow when the hash does not match any entries in the hash table.

According to an embodiment, the first path thread processes the first data packets of the known data packet flow according to a previously generated rule that is stored in a memory.

According to an embodiment, the processing core further includes a rules hash table including rules to process different packet flows, wherein, for each second data packet, the second path thread is configured to process the second data packet by identifying a rule in the rules hash table associated with the second data packet, process the second data packet according to the rule, and update the connections hash table such that additional incoming packets of the same data packet flow as the second data packet, which are received after the second data packet, will be classified as first data packets of the known data packet flow and processed in the first path thread according to the rule generated earlier in the second path.

According to an embodiment, the first path thread uses fast interrupt requests (FIQ), and the second path thread uses a host operating system network stack.

According to an embodiment, the second path thread is further configured to determine a forwarding rule for forwarding data packets corresponding to the new data packet flow, and update the first path thread to use the forwarding rule on data packets corresponding to the new data packet flow.

According to an embodiment, the classifier is configured to classify each of the incoming data packets as being associated with a corresponding packet flow indicative of a stream of packets of a particular type, having a same source and a having same destination.

According to an embodiment, the second path thread employs Just-in-time (JIT) rule compilation to identify a rule to process the new packet type.

According to an embodiment, the processing core further includes a hardware abstraction layer (HAL) network driver to receive the incoming data packets and another HAL network driver to transmit the data packets, after being processed by one of the first path thread and the second path thread, to corresponding destinations.

According to another embodiment, a packet processing method includes classifying, in a single processing core, incoming data packets into first data packets of a known data packet flow and into second data packets of an unknown data packet flow; processing, in the single processing core, ones of the first data packets at least by forwarding the first data packets to a destination that corresponds to a previously determined destination associated with the known data packet flow; and processing, in the single processing core, a received second data packet at least to determine a new data packet flow for the second data packet.

According to another embodiment, the method further includes performing the classifying and the processing of the first data packets in a same first path thread.

According to another embodiment, for each of the incoming data packets, the method further includes: determining a hash corresponding to the incoming data packet; classifying the incoming data packet as a first data packet of the known data packet flow when the hash matches an entry in a connections hash table; and classifying the incoming data packet as a second data packet of the unknown data packet flow when an entry matching the hash is absent from the connections hash table.

According to another embodiment, for each packet classified as a second data packet, the method further includes: identifying based on a collection of packet attributes, the packet attributes including at least one or more of: a source, a destination, and a type of the packet; identifying a rule in a rules hash table associated with the second data packet; processing the second data packet according to the rule; and updating the connections hash table such that additional incoming packets of the same type as the second data packet, which are received after the second data packet, will be classified as first data packets of the known data packet flow.

According to another embodiment, the method further includes performing the processing of the first data packets using fast interrupt requests (FIQ), and performing the processing of the second data packets using a host operating system network stack.

According to yet another embodiment, a processing core includes a first path thread, implemented in a single processing core, configured to receive a stream of data packets associated with one or more packet flows and to process data packets which are of a known class according to a rule associated with a known packet flow; and a second path thread, implemented in the single processing core, configured to receive, from the first path thread, data packets which are of an unknown class and to process the data packets of the unknown class.

DETAILED DESCRIPTION

Figure 1:
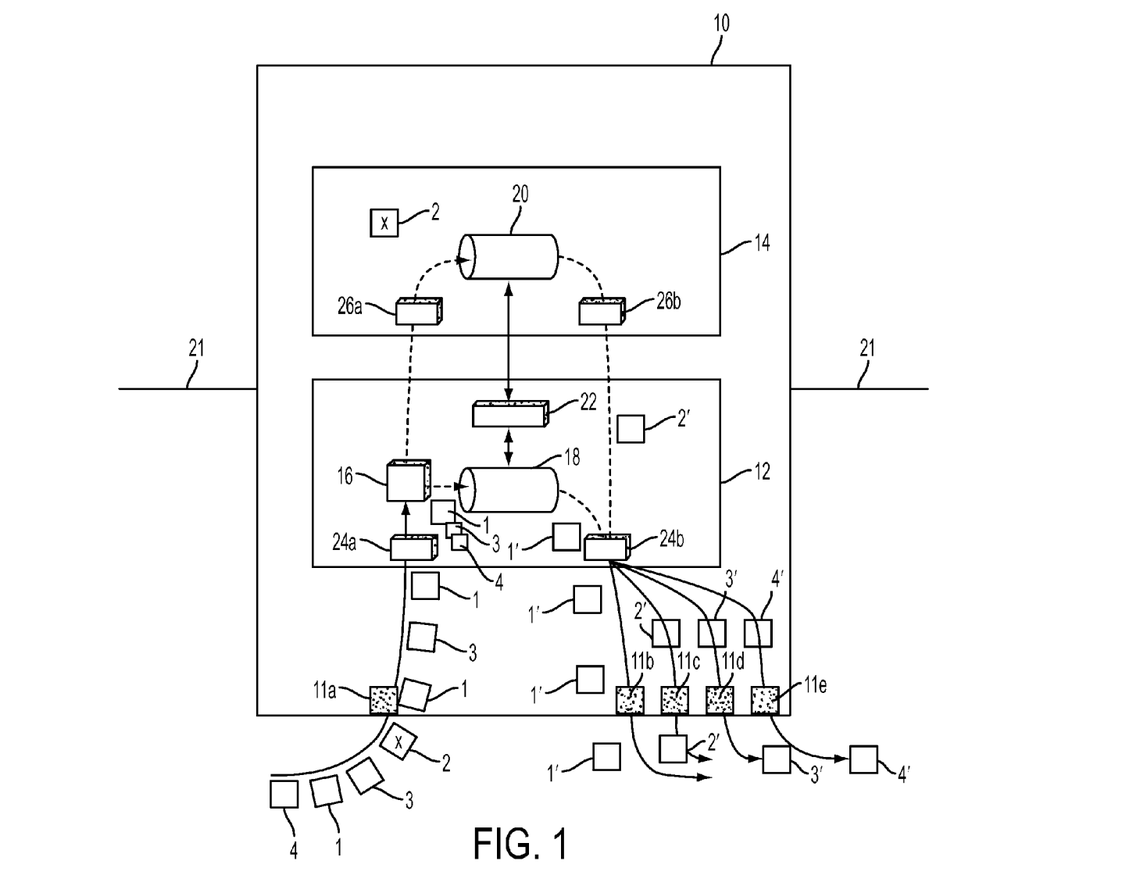
FIG. 1 is a block diagram illustrating a packet processor implemented as a single processing core system on chip, according to an embodiment.

FIG. 1 is a block diagram illustrating a packet processor implemented as a single processing core system on chip, according to an embodiment. As shown in FIG. 1, the single processing core 10 includes an ingress port 11a, egress ports 11b, 11c, 11d, and 11e, a first path thread 12, a second path thread 14, a classification unit 16, a first processing unit 18, a second processing unit 20, a shared memory 22, hardware abstraction layer (HAL) network drivers 24a, 24b and virtual network drivers 26a, 26b. The single processing core 10 is connected by a connection 21, for example to a computer network. In an embodiment, the single processing core 10 is implemented as a system on chip that is part of a central processing unit (CPU) in a network server, a home or office gateway, or any other suitable network device, etc., and the connection 21 connects the single processing core 10 to other electronic components inside of the computing device. In an embodiment, the single processing core 10 has an Advanced RISC Machine (ARM) architecture.

The single processing core 10 is configured to receive and process packets and output the processed packets to appropriate destinations (e.g., ports), in an embodiment. Packets are typically received as a stream of packets. The stream of packets typically includes packets from different flows. The packets include information, for example, in a header, and this information is then used to classify the packets into flows. As shown in FIG. 1, the single processing core receives and processes several packet flows. The packets 1 belong to a known packet flow 1, the packets 3 belong to a known packet flow 3, and the packets 4 belong to a known packet flow 4. Thus, the packets 1, 3 and 4 are referred to as known packets, and belong to known packet flows. The first processing unit 18 processes the packets 1, 3 and 4 to generate processed packets 1', 3', and 4'. Packets 2 belong to an unknown packet flow that is processed in the second processing unit 20 to generate processed packets 2'. Thus, the packets 2 are referred to as unknown packets, and belong to unknown packet flows. According to an embodiment, a "known" packet flow refers to a flow of packets which originate from the same source, are directed to the same target or destination, and are of the same type, such as voice, streaming media (video, music, etc.), data, etc. Further, an "unknown" packet flow refers to a flow of packets that originate from an unknown source, are directed to an unknown target or destination, and/or are of an unknown type. The single processing core 10 performs different types of packet processing operations depending on whether the input packet is of a known packet flow or an unknown packet flow.

The ingress port 11a receives a stream of packets belonging to packet flows 1, 2, 3 and 4. The four egress ports 11b, 11c, 11d, and 11e are ports from which processed packets are egressed from the single processing core 10 after FIQ or slow thread processing respectively. It is understood that more or less than four packet flows may be used according to other embodiments, and that more than one packet flow may be egressed on the same port.

According to an embodiment, a known packet, such as the packets 1, 3 and 4 shown in FIG. 1, are already classified into a known packet flow. Packets of the same type (e.g., streaming video) passing through the single processing core 10 may be treated differently if the packets come from different sources or are destined for different targets. For example, packets 1 and 3 may both be the same type (e.g., packet of movies), but packet 1 may be for a different movie than packet 3, and thus packets 1 and 3 may have different sources and destinations. The known packets include information (characteristics) indicating a known destination, and/or may include information indicating a known class/type (e.g., HTTP, VoIP, video streaming, etc.). Since this information is already known when the known data packets are input to the single processing core 10, the single processing core 10 can perform minimal packet processing operations, as compared to a case when the information is unknown.

The data packets 2 belonging to an unknown packet flow include information which is unknown about the packets when the packets are received at the single processing core 10. The second data packets 2, therefore, are packets of an unknown data packet flow. For example, the second data packets 2 may have been received from a source that is different from the source of previously received packets, may be directed to a destination that is different from the destination of previously received packets, or may be of a class or type that is unknown or different from the class/type of previously received packets. Since this at least one characteristic is unknown or different from the characteristics of previously received packets when the second data packets 2 are received at the single processing core 10, the single processing core 10 performs more extensive packet processing operations, as compared to a case when the received packet is associated with a previously known flow of packets.

The known data packets (data packets 1, 3 and 4) and unknown data packets (data packets 2) are each part of a respective packet flow, in an embodiment. A "packet flow" according to embodiments may be defined in many different ways according to many different technical standards. For example, a packet flow is defined, in an embodiment, as a stream of packets of a particular type, having a same source and a having same destination. In another example, a packet flow may be defined as an artificial logical equivalent to a call or connection. In another example, a packet flow may be defined as a set of Internet Protocol (IP) packets passing an observation point in a network during a certain time interval. Thus, embodiments disclosed herein may be implemented in accordance with many different types of packets and packet flows.

The first path thread 12 (also referred to as the "fast path thread 12") is implemented in the single processing core 10 and is configured to initially receive input data packets, process the data packets 1, 3 and 4 of the known packet flows, and forward the data packets 2 of the unknown packet flow to the second path thread 14 for processing. At classification unit 16 incoming packets are simply classified as belonging to a known flow (there may be several known flows), or to an unknown flow. If the flow is known (which is typically the majority of packets in an active session), then the packet is processed in the fast path. If the flow is not known, for example when a new flow starts up, the packet is processed in the regular path. In reality, there are typically several flows in any time interval that are known. Similarly, in any time interval there may be one or more flows that are unknown and therefore require more intensive processing, including flow classification, in the second path thread 14.

The fast path thread 12 includes a hardware abstraction layer (HAL) network driver 24a to receive input packets and a HAL network driver 24b to transmit processed packets to their destinations.

The fast path thread 12 (also referred to as the FIQ 12) further includes a classification unit 16 (also referred to as a "packet classifier"). The classification unit 16 receives the input packets from the HAL network driver 24 and classifies the input packets as either known data packets or unknown data packets. The classification unit 16 classifies the packets according to various techniques, such as, for example, parsing out relevant data from a packet header and/or a bit-string hashing technique on parsed header data as described later with reference to FIG. 2. Furthermore, although FIG. 1 illustrates the classification unit 16 as being included within the fast path thread 12, the classification unit 16 is not required to be included within the fast path thread 12, and may instead be located outside of the fast path thread 12 according to other embodiments.

The fast path thread 12 further includes a first processing unit 18. The first processing unit 18 receives the known data packets from the classification unit 16 and processes the known data packets. In an embodiment, the first processing unit 18 is configured to process the known data packets using fast interrupt request (FIQ), thereby achieving efficient processing of the known data packets. FIQ processing is a high priority type of processing which is not affected by regular interrupt requests (IRQ) or other actions, such as actions taken by the host operating system (OS). It is noted that other embodiments may use other processing techniques instead of or in addition to FIQ processing to process the known data packets. For example, other processing techniques may be selected based on the context of the packet processing operation, such as, for example, when the processing should be fast, protected, not interrupted, etc.

The fast path thread 12 also includes, in an embodiment, a shared memory 22 to store rules which are used to process packets during FIQ processing. These stored rules may be various types, for example, forwarding rules, rules for dropping malicious packets, rules for multicasting, etc. The first processing unit 18 accesses and uses rules stored in the shared memory 22 to process the known data packets.

The second path thread 14 (also referred to as the "slow path thread 14") receives the unknown data packets forwarded from the fast path thread 12, parses information from the packet, typically the packet header, uses the information to determine a flow classification and determine rules, such as forwarding rules, by which to process the present packet and then to be used when processing subsequent packets of the same flow in the FIQ 12. Although the unknown data packets (packets 2) are seen in the figure as being processed by the slow thread, once the flow is classified and the rules are determined, in an alternative embodiment, the rules are provided to the FIQ 12 and the newly classified packet is returned to the stream which is then processed by the FIQ 12 as if belonging to a known flow. In most situations, the quantity of packets processed by the slow path thread 14 is substantially less than the quantity of packets processed by the fast path thread 12, because typically the substantial majority of input packets belong to known flows, such as first data packets 1, 3 and 4. However, since the second data packets 2 include at least one unknown characteristic, the second data packets 2 require additional packet processing operations to be performed, as compared to the known data packets 1, 3 and 4. Additional packet processing operations include, for instance, learning the packet attributes, developing rules for subsequent processing, and updating FIQ processes, in an embodiment.

The slow path thread 14 includes a virtual network driver 26a to receive second data packets 2 forwarded from the classifier 16 in the fast path thread 12 and a virtual network driver 26b to transmit the second data packets 2 back to the fast path thread 12 after processing, in an embodiment. Flows are directed to an appropriate port among several ports (in a home gateway, for example, there are typically 4 wired ports and several more additional wireless ports). In an embodiment, HAL network driver 24b is configured as an egress unit that handles transmission to the respective ports 11b, 11c, 11d, and 11e. Alternatively, each of the respective FIQ and slow threads may handle their own transmission to the respective physical ports.

The slow path thread 14 includes a second processing unit 20. The second processing unit 20 receives the second data packets 2 forwarded from the classification unit (which in the embodiment shown in FIG. 1 happens to be in the fast path thread 12) and processes the second data packets 2. The operation of "processing" the second data packets 2, when used in connection with the processing performed by the second processing unit 20, refers to a process of identifying a flow and formatting various rules, such as forwarding rules, corresponding to the flow for processing packets in the flow. The second processing unit 20 is configured to process the second data packets 2 using a host operating system network stack (e.g., Linux, etc.).

When an initial packet in a packet flow of second data packets 2 is forwarded to the second processing unit 20 by the classification unit 16, the second processing unit 20 first parses or extracts information from the packet header, then analyzes the extracted information, identifies at least one rule (e.g., from a database) to process the packet, processes the initial packet using the rule, and initiates a process to classify subsequent packets of the same type as known packets instead of unknown packets. In an alternative embodiment, all that the slow thread does is learn the packet to set up a new flow. Setting up a new flow may require learning/classifying several packets all having the same flow information. As a result, packets of the same type as the initial packet (e.g., subsequent packets in the same packet flow), which are received after the initial packet, can be classified by the classification unit 16 as a known data packet belonging to a known data packet flow, instead of an unknown data packet belonging to an unknown data packet flow, as explained in more detail below. Thus, the classification unit 16 may be able to classify packets belonging to the same packet flow only one time, and save information related to the classified packets in a memory. The flow may be saved for a period of time (e.g., several minutes, hours or days), after which the flow may need to be re-learned due to changes in control plane rules affecting the flow.

In an embodiment, the first path thread 12 and the second path thread 14 are distinct hardware threads implemented in the same single processing core 10. This process of using the single processing core 10 instead of separate processing cores for each path thread, as is conventionally done, is referred to as hardware virtualization. The single processing core 10 employing hardware virtualization achieves several benefits over the conventional 2-CPU model, including reduced costs.

In general, most packet flow traffic relates to only a few flows. Specific flows require very simply handing, and as such, can be handled using a short execution path (e.g., FIQ/fast path thread 12), in an embodiment. Conventionally, classification codes used to classify packet flows and modification codes used to modify packet flows are inter-mixed in a processor, resulting in a large overhead for specific packet flows in the processor. In contrast, according to an embodiment, the processes of classifying and modifying packet flows is divided such that the first path thread 12 classifies the packet flows based on whether the packet flows are known or unknown, and only in the event that a packet flow is determined to be an unknown packet flow, then the packet belonging to an unknown flow is provided to the second path thread 14 which then becomes involved in processing the packet belonging to an unknown flow. Since typically the substantial majority of packet flows are known packet flows, classification and processing of these known packet flows is performed at the fast path thread 12, resulting in a significant performance boost because the fast path thread processes packets faster than the slow path thread. Furthermore, for unknown packet flows, the slow path thread 14 generates a code to process the unknown packet flow after identifying a rule associated with the unknown packet flow, a process referred to as "Just-in-time" (JIT) rule compilation, which is a type of dynamic translation to improve the runtime performance of computer programs by using continuously occurring translation as well as caching of translated code to minimize performance degradation. By employing JIT rule compilation, the single processing core 10 requires fewer memory accesses than a processing core which does not employ JIT rule compilation, further increasing network performance.

Figure 2A:
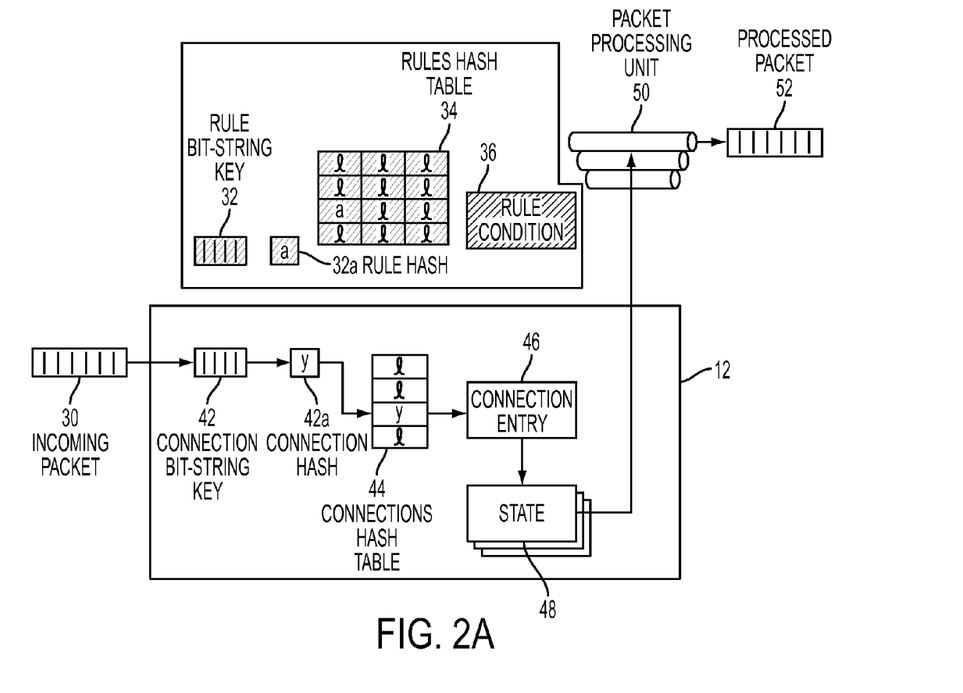
FIGS. 2A and 2B are block diagrams illustrating additional details of packet classification and packet processing components utilized by the single processing core 10 shown in FIGS. 1.
Figure 2B:
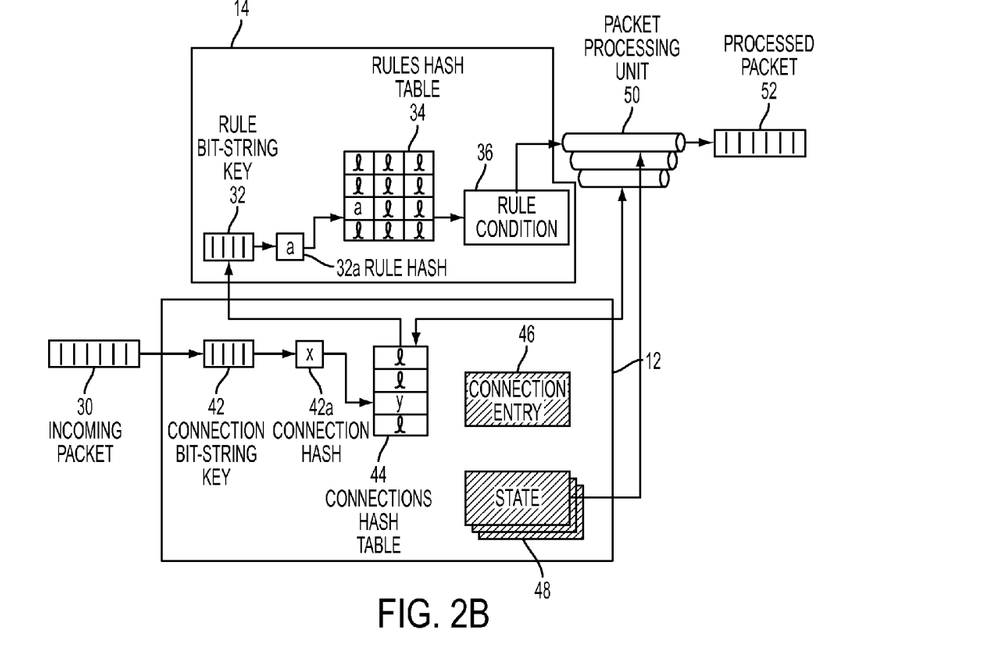

FIGS. 2A and 2B are block diagrams illustrating additional details of packet classification and packet processing components utilized by the single processing core 10 shown in FIG. 1. FIG. 2A shows the route taken by a known packet (a packet having known characteristics and belonging to a known packet flow). FIG. 2B shows the route taken by an unknown packet (a packet having unknown characteristics and belonging to an unknown packet flow). For illustrative purposes, both FIGS. 2A and 2B illustrate the same components, and the components which are not used for the routing shown in the particular figure are hatched out.

As shown in FIG. 2A, the packet classification and packet processing components utilized by the fast path thread 12 to process a known packet include a connections hash table 44. The packet classification and packet processing components are virtual, defined in code, and as such are not located in any fixed physical location, in an embodiment.

As shown in FIGS. 2A and 2B, an incoming packet 30 is classified as either part of a known data packet flow or an unknown data packet flow, and based on this classification, the packet 30 either follows a first processing route through the fast path thread 12 (FIG. 2A) or a second processing route through the slow path thread 14 (FIG. 2B).

According to an embodiment, to classify an incoming packet 30, the classification unit 16 uses the components shown in FIG. 2A to perform a bit-string hashing technique. To perform the bit-string hashing technique, the classification unit 16 extracts relevant bits of packet headers from the packet 30 (e.g., using a parser) and the relevant bits are arranged into a connection bit-string key 42. Then, the classification unit 16 determines a connections hash 42a (e.g., "y") based on the connection bit-string key 42. The classification unit 16 then compares the connections hash 42a to hashed entries stored in the connections hash table 44, where the hashed entries in the hash table 44 correspond to known data packet flows, respectively. This process is done on a packet-by-packet basis. Thus, for example, the packets numbered 3 (FIG. 1) are part of known packet flow 3 (same type, same source, same destination). Thus, a hashed entry is stored in the connections hash table 44 for known packet flow 3.

Thus, the connections hash table 44 is used to determine whether an incoming packet 30 can be determined to have a set of known characteristics that are stored in the table 44. The connection entry mechanism then determines whether there were previously received packets all having the same characteristics, i.e., identifies the packets belonging to a known flow. Then, the first processing unit 18 identifies a connection entry 46 corresponding to the entry in the connections hash table 44 which matches the connection hash 42a. The connection entry 46 includes information related to the specific type of the packet 30 from among a plurality of types of packets. The packet types may be based on many different criteria, for example, source/destination addresses, packet type (VoIP, HTTP, etc). Then, the first processing unit 16 determines a state 48 corresponding to the connection entry 46. The state 48 includes information associated with the specific type of modifications to be performed on the packet 30 to thereby process the packet 30 (in other words, includes information related to a previously generated rule). Then, the first processing unit 16 determines a packet processing unit 50 corresponding to the state 48. The packet processing unit 50, which is a code, may be considered to be a "modification pipe" which modifies the incoming packet 30. The packet processing unit 50 processes the packet 30 and outputs the packet after processing as a processed packet 52. For example, a forwarding decision is made (e.g., by the packet processing unit 50), and when it is determined that a packet 30 is to be forwarded, the packet processing unit 50 then modifies various header information to be consistent with the forwarding decision and to enable further processing downstream in the network.

In an embodiment, each of the packet processing units 50 is a compiled code which makes a forwarding decision and, if necessary, modifies the packet 30 in any of various ways, for example, changing a destination address, changing an encoding/decoding method, etc. Furthermore, a plurality of the packet processing units 50 are provided which correspond to a plurality of the states 48, and the plurality of the packet processing units 50 are stored inside of the shared memory 22 in the fast path thread 12. Thus, since the classification unit 16 and the first processing unit 18 are located in the fast path thread 12, in an embodiment, each packet which is of a known packet flow (e.g., each first data packet 1, 3 and 4) can be classified and processed in the fast path thread 12 without requiring additional processing to be performed in the slow path thread 14, because the packets of a known type are routed through and processed entirely by the fast path thread 12.

FIG. 2B shows the route taken by a packet (e.g., packet 2) belonging to an unknown packet flow. As shown in FIG. 2B, the packet classification and packet processing components utilized by the slow path thread 14 to process an unknown packet include a rules hash table 44.

As shown in FIG. 2B, when the packet 30 is of an unknown packet flow (e.g., unknown packet type, unknown source, etc.), the connections hash 42a (e.g., x) of the packet 30 will not match any of the entries stored in the connections hash table 44, and the classification unit 16 will therefore classify the incoming packet 30 as an unknown data packet and forward the packet 30 to the slow path thread 14. Then, the slow path thread 14 extracts relevant bits of packet headers from the packet 30 and arranges the extracted bits into a rule bit-string key 32. Then, the slow path thread 14 determines a rule hash 32a (e.g., a) based on the rule bit-string key 32. Then, the slow path thread 14 compares the rule hash 32a to entries stored in the rules hash table 34, the entries indicating rules corresponding to different packet types. In an embodiment, the rules hash table 34 is larger than the connections hash table 44, since the rules hash table 34 stores many different types of rules.

When the slow path thread 14 identifies an entry stored in the rules hash table 34 which matches the rule hash 32a, the slow path thread 14 then determines a rule condition 36 corresponding to the matching entry. This is possible because although the packet 30 is of an unknown packet flow, the packet 30 has certain characteristics which correspond to rules. Then, the second processing unit 20 initiates a process to create/compile a packet processing unit 50 for processing the packet 30, based on information included in the rule condition 36 as well as information included in a library of network primitives which are used to build the packet processing units 50. The process of creating packet processing units 50 for unknown packets is performed in the slow path thread 14 because the slow path thread 14 does not have the same low latency requirements as the fast path thread 12. The slow path thread 14 is able to build the packet processing units 50 for packet flows. Additionally, a connection entry corresponding to the packet 30 of unknown packet flow is created and added to the connections hash table 44, as represented by the arrow between the packet processing unit 50 and the connections hash table 44 shown in FIG. 2B. In other words, feedback is provided from the packet processing unit 50 back to the connections hash table 44 to store a connection entry for the unknown packet. Additionally, an updating operation is performed which updates the action that is to be performed on the packets from the same packet flow as the packet with the newly stored connection entry in the connections hash table 44, as represented by the arrow between the packet processing unit 50 and the connections hash table 44. As a result, when subsequent packets from the same packet flow as the unknown packet are received, the classification unit 16 will classify the other packets as known packet types instead of unknown packet types and perform the appropriate action on the subsequent packets once their flow becomes known.

It is understood that other techniques instead of bit-string hashing may also be used to classify the packet flows according to other embodiments.

Figure 3:
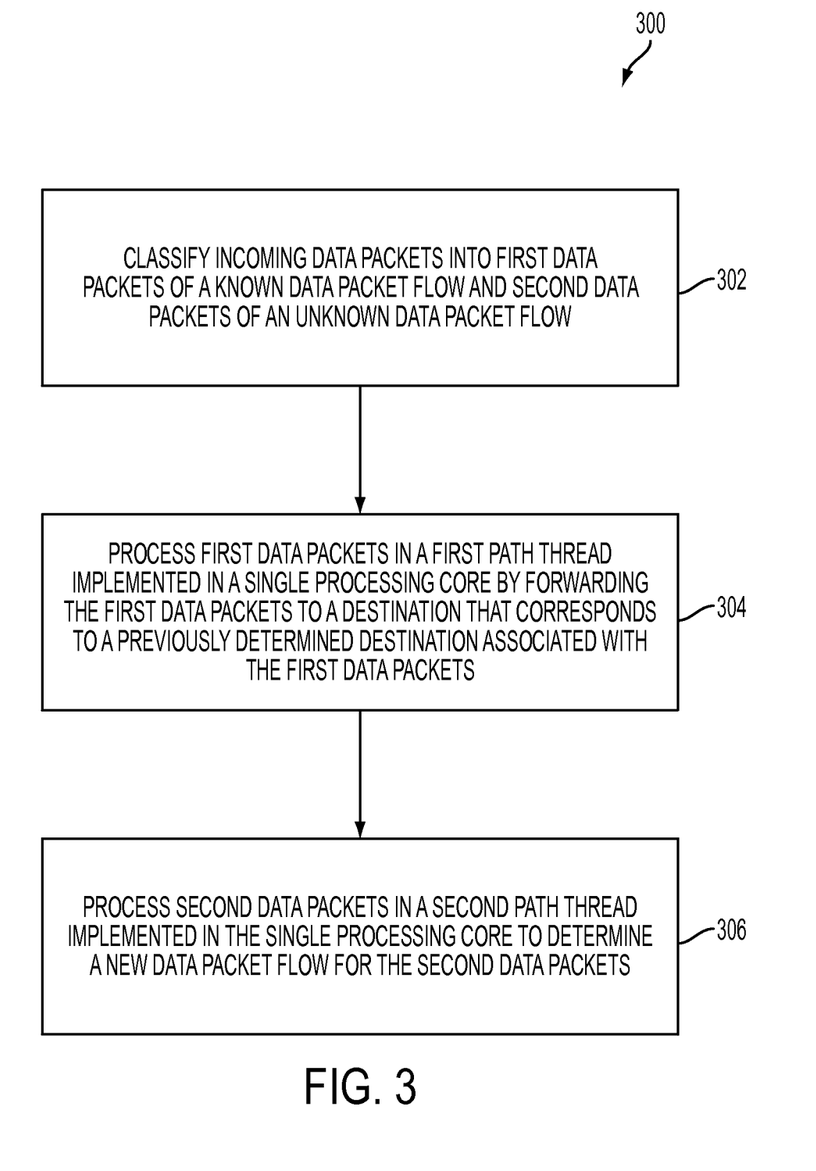
FIG. 3 is a flow diagram illustrating a packet processing technique according to an embodiment.

FIG. 3 is a flow diagram illustrating a packet processing technique according to an embodiment. In the following description of FIG. 3, references are made to various components illustrated in FIGS. 1 and 2 for illustrative purposes only. However, these references are by way of example only, and it is understood that the method of FIG. 3 may be performed by components other than those shown in FIGS. 1 and 2, according to other embodiments.

In operation 302, the classification unit 16 classifies incoming data packets into first data packets which are known data packets (belonging to a known packet flow) and second data packets which are unknown data packets (belonging to an unknown packet flow). In an embodiment, the classification unit 16 uses a bit-string hashing technique to perform the classification.

In operation 304, a first path thread 12 implemented in a single processing core 10 processes ones of the first data packets 1 at least by forwarding the first data packets 1 to a destination that corresponds to a previously determined destination associated with the first data packets 1.

In operation 306, a second path thread 14 implemented in the single processing 10 core processes a second data packet 2 at least to determine a new data packet flow for the second data packet.

While embodiments have been described, additional variations and modifications of the embodiments may occur to those skilled in the art once they learn of the basic concepts. Therefore, it is intended that the appended claims shall be construed to include both the above embodiments and all such variations and modifications that fall within the spirit and scope of the concepts of the embodiments.

What is claimed is:

1. A processing core, comprising: a packet classifier, implemented in a single processing core, configured to classify incoming data packets (i) into first data packet flow comprising a flow of packets which originates from a same source, are directed to a same destination, and are of a same type, and (ii) into second data packets of an unknown data packet flow comprising a flow of packets that originate from an unknown source, are directed to an unknown destination, and/or are of an unknown type; wherein the packet classifier is further configured to determine a hash corresponding to one of the incoming data packets, classify the incoming data packet as a first data packet of the known data packet flow when the hash matches an entry in the connections hash table, and classify the incoming data packet as a second data packet of the unknown data packet flow when an entry matching the hash is absent from the connections hash table;

a first path thread, implemented in the single processing core, configured to process ones of the first data packets using fast interrupt requests (FIQ) at least by forwarding the first data packets to the same destination associated with the known data packet flow; and a second path thread, implemented in the single processing core, configured to process a received second data packet using a host operating system network stack at least to determine a new data packet flow for the second data packet.

2. The processing core according to claim 1, wherein the packet classifier is implemented in the first path thread and classifies each of the first data packets into a specific packet flow from among a plurality of packet flows.

3. The processing core according to claim 1, wherein the packet classifier classifies the incoming data packets a single time.

4. The processing core according to claim 3, wherein one of the first path thread and the second path thread modifies each of the incoming data packets after being classified.

5. The processing core according to claim 1, wherein the first path thread processes the first data packets of the known data packet flow according to a previously generated rule that is stored in a memory.

6. The processing core according to claim 1, further comprising a rules hash table comprising rules to process different packet flows,
wherein, for each second data packet, the second path thread is configured
to process the second data packet by identifying a rule in the rules hash table associated with the second data packet,
process the second data packet according to the rule identified in the rules hash table is being associated with the second data packet, and
update the connections hash table such that additional incoming packets of the same data packet flow as the second data packet, which are received after the second data packet, will be classified as first data packets of the known data packet flow and processed in the first path thread according to the rule generated earlier in the second path.

7. The processing core according to claim 1, wherein the second path thread is further configured to determine a forwarding rule for forwarding data packets corresponding to the new data packet flow, and update the first path thread to use the forwarding rule on subsequent data packets corresponding to the new data packet flow.

8. The processing core according to claim 1, wherein the classifier is configured to classify each of the incoming data packets as being associated with a corresponding packet flow indicative of a stream of packets of a particular type, having a same source and having a same destination.

9. The processing core according to claim 1, wherein the second path thread employs Just-in-time (JIT) rule compilation to identify a rule to process the new packet type.

10. The processing core according to claim 1, further comprising a hardware abstraction layer (HAL) network driver to receive the incoming data packets and another HAL network driver to transmit the data packets, after being processed by one of the first path thread and the second path thread, to corresponding destinations.

11. A packet processing method, comprising:
classifying, in a single processing core, incoming data packets (i) into first data packets of a known data packet flow comprising a flow of packets which originate from a same source, are directed to a same destination, and are of a same type, and (ii) into second data packets of an unknown data packet flow comprising a flow of packets that originate from an unknown source, are directed to an unknown destination, and/or are of an unknown type, wherein classifying the incoming data packets comprises
determining a hash corresponding to one of the incoming data packets,
classify the incoming data packet as a first data packet of the known data packet flow when the hash matches an entry in the connections hash table, and
classify the incoming data packet as a second data packet of the unknown data packet flow when an entry matching the hash is absent from the connections hash table;
processing, in the single processing core using fast interrupt requests (FIQ) ones of the first data packets at least by forwarding the first data packets to the same destination associated with the known data packet flow; and
processing, in the single processing core, using a host operating system network stack, a received second data packet at least to determine a new data packet flow for the second data packet.

12. The method according to claim 11, further comprising performing the classifying of second data packets in a first path thread implemented in the single processing core, and processing second data packets using the host operating system network stack provided in a second path thread implemented in the single processing core.

13. The method according to claim 11, wherein for each packet classified as a second data packet, the method further comprises:
selecting from among a collection of packet attributes, attributes corresponding to a selected second data packet, the packet attributes including at least one or more of: a source, a destination, and a type of the packet;
identifying, based on the selected attributes, a rule in a rules hash table associated with the second data packet;
processing the second data packet according to the rule identified as being associated with the second data packet; and
updating the connections hash table such that additional incoming packets of the same data packet flow as the second data packet, which are received after the second data packet, will be classified as first data packets of the known data packet flow.

14. A packet processing core, comprising:
a first path thread, implemented in a single processing core, configured to (i) receive a stream of data packets associated with one or more packet flows, and (ii) process data packets belonging to a known packet flow using fast interrupt requests (FIQ) according to a rule that is associated with the known packet flow, wherein the known packet flow comprises a flow of packets which originate from a same source, are directed to a same destination, and are of a same type; and
a second path thread, implemented in the single processing core, configured to (i) receive, from the first path thread, data packets belonging to an unknown packet flow, and (ii) process the data packets of the unknown packet flow using a host operating system network stack, wherein the unknown packet flow comprises a flow of packets that originate from an unknown source, are directed to an unknown destination, and/or are of an unknown type, the first path thread being further configured to (i) determine a hash corresponding to one of the received data packets, (ii) classify the received data packet as a first data packet of the known data packet flow when the hash matches an entry in a connection hash table, and (iii) classify the incoming data packet as a second data packet of the unknown data packet flow when an entry matching the hash is absent from the connection hash table.

* * * * *